United States Patent [19]
Marshall et al.

[11] Patent Number: 5,395,686
[45] Date of Patent: Mar. 7, 1995

[54] BULLET RESISTANT MATERIAL

[75] Inventors: Peter J. Marshall, Baulkham Hills; Christopher J. Smith, Wentworthville, both of Australia

[73] Assignee: Martial Armour Pty Limited, Sydney, Australia

[21] Appl. No.: 190,999

[22] Filed: Feb. 3, 1994

[30] Foreign Application Priority Data

Aug. 19, 1993 [AU] Australia .............. 44769/93

[51] Int. Cl.⁶ .............................. B32B 5/16
[52] U.S. Cl. .................. 428/283; 428/285; 428/323; 428/324; 428/402; 428/911
[58] Field of Search .......... 428/283, 285, 289, 290, 428/402, 404, 324, 911

[56] References Cited

U.S. PATENT DOCUMENTS

| | | | |
|---|---|---|---|
| 4,186,648 | 2/1980 | Clausen et al. | 428/911 |
| 4,292,882 | 10/1981 | Clausen | 428/911 |
| 4,584,228 | 4/1986 | Droste | 428/911 |
| 4,674,394 | 6/1987 | Martino | 428/911 |
| 4,812,359 | 3/1989 | Hall | 428/911 |
| 4,822,657 | 4/1989 | Simpson | 428/911 |
| 5,087,516 | 2/1992 | Groves | 428/911 |
| 5,098,781 | 3/1992 | Minnick | 428/285 |
| 5,110,661 | 5/1992 | Groves | 428/911 |
| 5,215,813 | 6/1993 | Hartman et al. | 428/911 |

Primary Examiner—James J. Bell
Attorney, Agent, or Firm—Abelman, Frayne & Schwab

[57] ABSTRACT

A bullet resistant material is provided which includes at least one integral compressed core formed of fibrous material bonded and compressed together with resin. At least one coating layer is applied on at least one face of the core, the coating layer including resin and at least 50% (by volume) filler particles.

16 Claims, 2 Drawing Sheets

BULLET RESISTANT MATERIAL

BACKGROUND TO THE PRESENT INVENTION

This invention relates to a bullet resistant material.

Up until this time various forms of bullet resistant materials have been known and used. For example, many forms of expensive reinforced glass are available which are used as bullet proof material. Attempts have been made to develop a bullet resistant material, which is a combination of glass sheet and polycarbonate sheet. However, these attempts have been unsuccessful in that the two materials are essentially incompatible, and no successful way of attaching them, or bonding them, one to the other has been achieved. In addition, various forms of metal bullet proof material are available and used. Bullet proof materials are used in buildings and installations where it is desired to provide safety and security. For example, banks, financial institutions and certain government offices often utilise bullet resistant materials in association with certain areas within installations, or alternatively in the construction of buildings or installations where security is desired. The use of such bullet resistant materials if of course commonly used in banks and financial institutions. Also however, it is used in certain defence establishments, police stations, detention centres, and in association with foreign embassies, consulates and diplomatic installations.

One of the problems with known forms of bullet resistant materials is that they are particularly expensive, difficult to manufacture, and in some cases (where metal materials are used), heavy and difficult to transport, manoeuvre, install and repair. For example, the bullet resistant materials generally available in the form of glass, are very expensive and the expense relates to both manufacture, and installation. The metal bullet resistant materials used are very heavy and are thus difficult to transport, install, repair and maintain. For example, if it was desired to install some metal bullet resistant partitioning within a building (such as a bank or diplomatic installation), substantial manpower or machine would be needed to lift and manoeuvre the metal bullet proof or resistant material. In addition, in many cases where metal materials are used, support structures have to be built up to support the metal material. These known materials therefore present certain difficulties and such difficulties involve both time and expense. It should be appreciated that difficulties also arise with the use of known materials (including metal materials) in mobile security installations, banks, armoured cars, and the like. These are however by way of example only.

It is an object of this invention to go at least some way towards overcoming or minimising the above problems and to provide the public and industry with a useful and meaningful choice in the use of bullet resistant materials.

It is a further object of this invention to provide a straightforward and efficient bullet resistant material.

Other objects of this invention will become apparent from the following description.

BRIEF SUMMARY OF THE PRESENT INVENTION

According to one aspect of this invention there is provided a bullet resistant material including at least one integral and compressed core formed of fibrous material, bonded together with resin; said at least one core having a coating layer applied on at least one face thereof; said coating layer including at least resin and at least 50% (by volume) filler particles.

According to a further aspect of this invention there is provided a bullet resistant material including a core in the form of an integral compressed core formed of a plurality of woven fibreglass mats, bonded and compressed together with a resin; said at least one core having a coating layer on at least one face thereof; said coating layer including at least resin and at least 50% (by volume) of a plurality of filler particles in the form of hollow spheres.

According to a further aspect of this invention there is provided a bullet resistant material including a plurality of spaced apart integral and compressed cores, said cores being formed of a plurality of woven fibreglass mats, compressed and bonded together with a resin; a coating layer being provided and being applied to and between adjacent faces of at least two spaced apart cores; and on an outer face of at least one core; said coating layers including resin and at least 50% (by volume) filler particles.

According to a further aspect of this invention there is provided a bullet resistant material including a plurality of spaced apart integral and compressed cores, said cores being formed of a plurality of woven fibreglass mats, compressed and bonded together with a resin; a coating layer being provided and being applied to and between adjacent faces of at least two spaced apart cores; and on an outer face of at least one core; said coating layers including resin and at least 50% (by volume) filler particles; wherein said filler particles are in the form of hollow spheres of fused alumino silicate having no less than 10% wall thickness.

BRIEF DESCRIPTION OF THE ACCOMPANYING DRAWINGS

This invention will be described by way of example only, and with reference to the accompanying drawings, wherein:

FIG. 1 is a side diagrammatic view of a bullet resistant material according to one form of the present invention, FIG. 2 is a side diagrammatic view of a bullet resistant material according to a further form of the present invention, and FIG. 3 is a side diagrammatic view of a bullet resistant material according to a further form of the present invention.

DETAILED DESCRIPTION OF PREFERRED EMBODIMENTS OF THE PRESENT INVENTION

Figure 1:
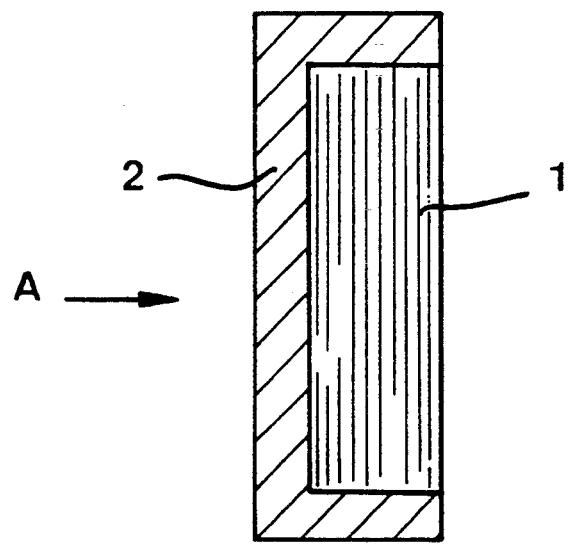

This invention will be described by way of example only, and it should be appreciated that modifications and improvements may be made to the invention without departing from the scope of the invention as defined by the appended claims.

The bullet resistant material of the present invention provides substantial advantages over the known bullet resistant materials available and used up until this time.

The present invention provides a bullet resistant material which includes at least one core together with a coating material, which can be applied to a single core or between and to a plurality of cores which are spaced apart one from the other. Whether or not a single core or a plurality of cores and coating layers are provided, depends upon the desired thickness of the bullet resistant material being manufactured and of course depending upon the desires of the user and the purposes for which the bullet resistant material is to be used. This will be further described and referred to hereinafter.

The bullet resistant material of the present invention includes one or more cores. The cores are formed of compressed fibreglass mats which are bonded together with a first resin, and compressed to obtain a core of a desired thickness.

Each core is formed by providing a plurality of woven fibreglass mats, for example using an 800 gram per $m^2$ woven fibrous strand. The woven fibrous glass strand is woven into a mat form which then acts as a base for the core. For example, each woven fibreglass mat may be approximately 1 mm in thickness, although this is by way of example only. A plurality of woven fibreglass mats are used in the formation of a core. The mats are coated with a first resin, in the form of an appropriate polyester resin. This bonds the mats together. Once the predetermined number of mats have been formed and bonded together with the first resin (to obtain a core of a desired thickness), the woven fibreglass mats are compressed. Following compression at a predetermined pressure for a predetermined period of time (depending upon the desired thickness of the core), the core is allowed to cure.

By way of example only, in the formation of the cores, and in one form of the invention, the ratio of fibre mat/resin can be calculated on the basis of 10 mm of resin per 12 layers of 800 gm mat of fibre. This is however by way of example only.

The cores are then used in the construction and formation of bullet resistant material, together with other components, as will be described hereinafter.

The first resin preferably used in the formation of the cores is a polyester resin. By way of example only, an appropriate liquid polyester resin that can be used to advantage is known under the trade mark SYNOLITE 40-6519. By way of example, details of such a resin are:

| | |
|---|---|
| Appearance | clear/grey amber |
| Specific gravity | 1.08 |
| Viscosity | Brookfield RVT 25° C. 100–125 cps |
| Volatile content | 37% |
| Gel time/1% MEKP, 25° C. | 50–60 mins |
| Storage life 20° C. | 3 months |
| Refractive index | 1.522 |

These are by way of example only, and other appropriate polyester resins can be used to bond the woven fibreglass mats together, so that following compression the core members of the present invention are formed.

In forming the bullet resistant material of the present invention, a coating layer is applied to at least one surface of at least one core, although in other forms of the invention (as will be described hereinafter by way of example), some forms of bullet resistant material are formed with a plurality of spaced apart cores with coating layers therebetween and if desired on one or more outer surfaces of outermost cores.

The coating layer is formed from an admixture of a second resin filler, particles of calcinated alumino silicate, and where appropriate, one or more catalysts.

In a preferred form of the invention, a second resin used in the coating layer is a low viscosity, low reactivity, high clarity, acrylic modified polymer resin. By way of example only, an appropriate resin is one which is for example also designed and used for decorative coatings and the embedding of particles therein. One example of an appropriate low viscosity, low reactivity, high clarity resin which is able to be used in the formation of the coating layer, is known under the trade mark ESCON E X80 (61-286). This is however by way of example only. In that regard, and again by way of example, details of such a resin are:

| | |
|---|---|
| Colour | pale green |
| Clarity | clear |
| Viscosity at 25° C. | HI |
| Specific gravity at 25° C. | 1.115 + 0.01 |
| Styrene compatibility | Infinite |
| Uncatalysed stability at 25° C. | 3 months |
| Gel time at 25° C. | 40–50 mins |

These are however by way of example only and it should be appreciated that other appropriate resins may be used in the formation of the coating layer.

In the formation of the coating layer, a plurality of particles are mixed into and with a second resin, these particles preferably being silicate particles, for example particles of calcinated alumino silicate.

While the invention is described by way of example only, with reference to first and second resins used in the formation of the core and the coating layer, the same resins can be used in the formation thereof, if desired. It is however important that the resins used allow the fibrous mats to be compressed and bonded together, and that they allow the coating layer and core(s) to be attached and bonded one to the other.

In one form of the invention, such particles are in the form of hollow spheres, for example hollow spheres of fused alumino silicate having no less than 10% wall thickness. These have been found to be particularly effective as filler particles in the outer coating layer of the present invention. In other forms the spheres may be ceramic microsphere particles, for example formed of calcinated alumino silicate, combining colour, low weight, high compression strength, low absorption and relatively low shrinkage. Details of the calcinated alumino silicate particles, by way of example, are:

| | |
|---|---|
| Size | 20–300 microns |
| Colour | white |
| Relative density | 0.70 g/cc |
| Bulk density | 100 kg/$m^3$ |
| Melting point | 1600–1800° C. |
| Hardness: | 5–7 mohs scale |

The chemical properties of calcinated alumino silicate, in one form of the present invention are:

| | |
|---|---|
| Silica (Si O2) | 55% (by weight) |
| Alumina ($Al_2O_3$) | 43.3% (by weight) |
| Iron (as $Fe_2O_3$) | 0.5% (by weight) |
| Titanium dioxide (Ti O2) | 1.1% (by weight) |

In a further form of the invention the particles can be in the form of particles of a calcine metal silicate such as available under the trade mark WOLLASTONITE. These particles are generally in flake form.

If desired, a combination of hollow spheres and flakes or particles of a silicate filler can be used. Further, other forms of appropriate silicate fillers can be used.

If desired, the admixture of the coating layer (which will be discussed further hereinafter) can also include one or more catalysts. One appropriate form of catalyst is methyl ethyl ketone peroxide which is a colourless, mobile liquid, consisting of peroxide based on methyl ethyl ketone. This is de-sensitised with phthalate plasticiser. The ketone peroxide is used as an initiator (radical source) in the curing of unsaturated polyester resins. By way of example only, typical properties of such a catalyst may be:

| Appearance | colourless liquid |
| --- | --- |
| Active oxygen | 3.7% w/w mins |
| De-sensitising agent | phthalate plasticiser |
| Density at 20° C. | ca. 1.15 g/cm$^3$ |
| Flash point | above 62° C. |

This is by way of example only and other catalysts could be used to advantage.

In the preferred form of the present invention, the filler particles are added to and mixed with a predetermined or desired amount of resin, and are mixed until both properties are formed into a thick pliable substance. Thereafter, a predetermined amount of catalyst is added to the pliable substance and mixed thoroughly to ensure that the catalyst is spread throughout the substance.

In a preferred form of the invention and in the formation of the coating layer, the proportion of filler particles to resin (prior to the addition of a catalyst) is at least 50% (by volume) silicate particles to 50% (by volume) resin. In a more preferred form of the invention, the proportion is at least 60% (by volume) filler particles to 40% (by volume) resin. These are however by way of example only.

Further, while the invention is described with reference to the use of silicate particles as a filler in the coating layer, other fillers such as other ceramic fillers and the like, in particle form, can be used. It is however important that the coating layer include at least 50% (by volume) filler particles so that the coating layer blunts, strips and reduces the velocity of a bullet fired into the coating layer, and before the bullet passes into the core to be arrested in the fibrous core material.

The resulting admixture is then poured and coated onto at least one outer side of the core and is screeded to ensure an even thickness of coating on at least one side of the core. The coating is then allowed to set and adhere to the at least outer side of the core, and the building material is then placed in storage for a predetermined period of time to allow for curing.

In various forms of the invention, as will be described with reference to the accompanying drawings, the coating layer can be applied to one outer or 'attack' side of a core or if a plurality of cores is to be used, can be provided between spaced apart cores so long as a coating layer is provided on the outermost or attack side of a core, to be exposed to bullets. If desired, an outer coating layer can be applied to one or more cores, so as to completely extend about and encapsulate said at least one or more cores.

This invention will now be described by way of reference only to examples of the bullet resistant material, and in so describing such examples, reference will be made to the fact that the resultant bullet resistant panels have been found to meet the necessary Australian standards for bullet resistant materials, such as to comply with Australian Standard A.S. 2343 Part 2-1984. This Standard sets certain requirements and these are outlined below, and will be referred to in the following examples:

G 0—resistant to attack from a 9 mm handgun
G 1—resistant to attack from a 357 Magnum
G 2—resistant to attack from a 44 Magnum
S 0—resistant to attack from a 12 gauge shotgun, using an S G shot projectile
S 1—resistant to attack from a 12 gauge shotgun, using a solid slug projectile
R 1—resistant to attack from a 5.56 mm Armalite rifle
R 2—resistant to attack from a 7.62 mm Armalite rifle

EXAMPLE NO. 1

A panel is formed using the method referred to hereinbefore, having a fibreglass core of approximately 10 mm, with a coating on an outer or 'attack' side surface thereof, having a thickness of approximately 6 mm. Thus, the resultant bullet resistant material has a total thickness of approximately 16 mm.

The bullet resistant material includes one fibreglass core formed as referred to hereinbefore, which is placed in a horizontal and level position. By way of example, approximately 1.69 kg of calcinated alumino silicate particles is added to 3.14 kg of second resin, per square meter, and mixed until both properties are formed into a thick pliable substance. Thereafter, 31 gm of the catalyst is added to the pliable substance and mixed thoroughly to ensure that the catalyst is spread throughout the substance.

The coating is then poured onto the at least outer surface of the fibreglass sheet and is screeded to ensure a minimum even 6 mm layer is provided over at least the outer surface of the core, so as to achieve an overall thickness of approximately 16 mm.

Once the coating has set, the panels are placed in an appropriate storage area for approximately 7 days for curing. It has been found that such a bullet resistant material has a rating to meet the requirements:
G 0
G 1
S 0

EXAMPLE NO. 2

In this example, a bullet resistant material is formed from a core which is constructed to have a thickness of approximately 16 mm. Thereafter, the procedure outlined in Example No. 1 is followed, to apply a coating of a thickness of approximately 6 mm to an outer surface of the core. This then provides the bullet resistant material with a thickness of approximately 22 mm. This provides a rating as follows:
G 2
S 1

EXAMPLE NO. 3

In this form of the invention, a bullet resistant material is provided which has two spaced apart cores with a coating layer between the two spaced apart cores. In such a form of the invention, each core has a thickness of for example 13 mm, with the coating layer therebetween having a thickness of approximately 12 mm. This provides a thickness of approximately 38 mm, and bearing in mind the ratings outlined above, provides a rating for:
R 1

In such an example, the bullet resistant material is formed from two spaced apart fibreglass cores, each having a thickness of approximately 13 mm.

In use, two such fibreglass cores are positioned substantially vertically, such as in a frame, and a spacer tape or surround is provided extending about the panels so as to define and enclose that area between them, but leaving the upper space between the two cores open. This then provides an exposed cavity between the two cores and the outer coating material can be inserted into that cavity until the cavity is full. The coating material is then allowed to set and bond to the inwardly facing adjacent surfaces of the two spaced apart cores. Thereafter, the material is allowed to cure for a period of for example 7 days.

EXAMPLE NO. 4

In this form of the invention, a plurality of cores and layers of coating material are provided.

In this form of the invention, three cores are provided, two cores being approximately 16 mm in thickness, and one core being approximately 6 mm in thickness. Three layers of coating material are also provided, one layer being approximately 12 mm in thickness and two other layers each being approximately 6 mm in thickness.

This results in a nominal thickness of approximately 62 mm, which provides a rating of R 2.

In this example, the two cores of approximately 16 mm thickness and the one core of approximately 6 mm thickness are positioned vertically, spaced apart one from the other, in a frame or suitable support means. A length of tape or for example some enclosing means is then applied between each sheet, to create an overall thickness of 50 mm, with spacings between the cores. Amounts of the coating composition are then inserted between the cores and are allowed to set such that the material is then moved into a substantially horizontal position, with an exposed surface of a core of approximately 16 mm thickness facing upwardly. A layer of coating is then applied to said outer surface of the exposed core to a thickness of approximately 12 mm, after which this is allowed to cure and set in the manner referred to in the previous examples.

As referred to hereinbefore, such a material has a thickness of approximately 62 mm, which is sufficient for a rating of R 2.

From the above, it will be appreciated that the important feature of the present invention is that there is a combination of a core of compressed fibreglass mats, bonded together with a resin, coated on at least one 'attack' side thereof with a coating layer, including a resin and at least silicate particles. Various variations of the core and coating material can be arrived at, depending upon the thickness of material required and the rating desired.

Referring now to the accompanying drawings, it should be appreciated that this description is by way of example only.

Referring firstly to FIG. 1 of the accompanying drawings, it will be seen that there is a core of fibreglass material 1 provided, covered on one side thereof with a layer of coating material 2, the coating material 2 including a resin and at least 50% (by volume) filler particles, preferably in the form of hollow spheres; preferably formed of a silicate material—for example alumino silicate.

In FIG. 1 of the accompanying drawings the arrow A indicates the direction of travel of a bullet and the coating layer 2 is therefore provided on the leading or attack side of the material shown in FIG. 1 of the drawings. Thus, on one or more bullets travelling towards the material in the direction of A, the bullet or bullets will be caused to pass through the outer coating layer 2 which will result in the bullets being blunted, stripped and the velocity thereof substantially reduced. Thereafter, the blunted/stripped bullet, having had its velocity reduced, will pass into the core 1 to be emeshed in the fibreglass material where it will be arrested. It will be appreciated that the thickness of the coating layer 2 and the core layer 1 will depend upon the desires of the user.

Figure 2:
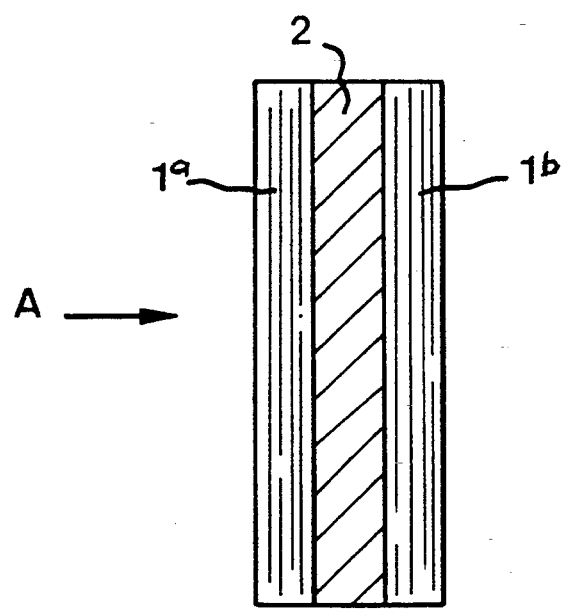

Referring now to FIG. 2 of the accompanying drawings, this shows a further form of the invention where for example a material is to be used where it is required that a fibreglass material such as a fibreglass core material 1 be provided on each side of a coating layer 2. For example, in the formation of a door panel, where it is desired that fibreglass be provided for finished purposes. In such a form of the invention, it will be appreciated that a coating layer 2 is still provided on the attack or lead face of one core layer. In the form shown in FIG. 2 of the accompanying drawings, arrow A shows the attack or lead face or direction of the material. In the first instance therefore, a bullet or bullets passing into the material shown in FIG. 2 of the accompanying drawings will pass through the core layer 1a, thereafter pass into and through the cover layer 2, where the bullet or bullets will be blunted, stripped and have the velocity thereof reduced. Thereafter the bullet or bullets will pass into the further core layer 1b to be arrested by the mesh.

In further forms of the invention any number of coating layers 2 and core layers 1 can be provided, juxtaposed one with the other, to form a material of any desired thickness.

Figure 3:
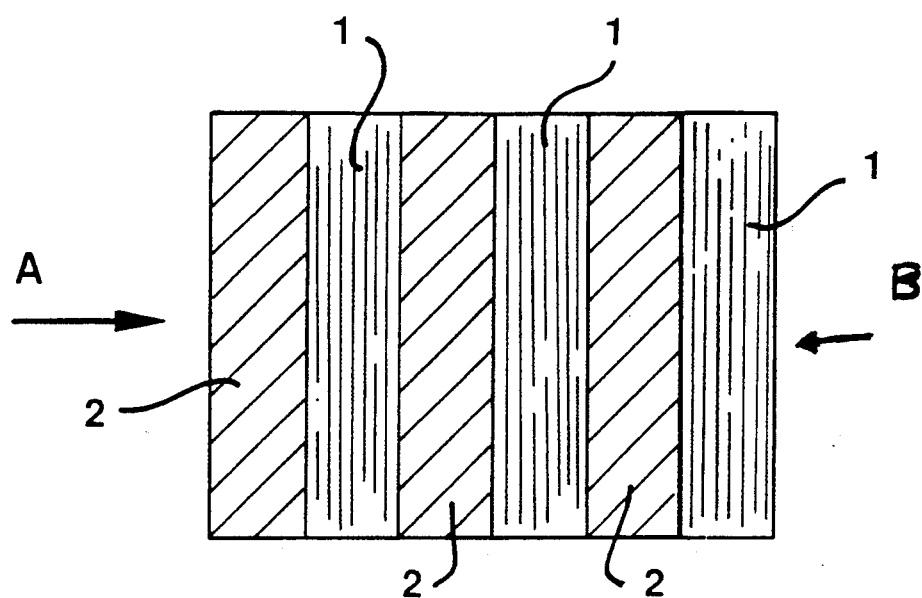

Referring therefore to FIG. 3 of the accompanying drawings, it will be seen that the attack or lead face of the material is the coating layer 2 in the direction of arrow A which is the direction of travel of a bullet or bullets. In an arrangement such as shown in FIG. 3 of the drawings there is therefore an outer coating layer 2, a fibreglass core 1, and thereafter a further coating layer 2, a further core layer 1, a further coating layer 2 and yet a further outer core layer 1.

In such a form of the invention as shown in FIG. 3 of the accompanying drawings, if for any reason very high velocity bullets are unable to be stopped by the initial coating layer 2 and core layer 1, the bullets will thereafter be further stripped by the innermost coating layer 2 and thereafter further embedded in the innermost core 1. As indicated earlier, the thickness of such materials depends very much upon the desires of a user. Further, in a form of the invention as shown in FIG. 3 of the accompanying drawings, if a bullet or bullets are fired in the direction of arrow B, they will firstly pass through the outer core 1, of fibreglass material to thereafter pass through the inner adjacent coating layer 2 to be stripped and blunted and to have the velocity reduced. Thereafter they will pass into the innermost core layer 1 (in the direction of arrow B), to be emeshed in the fibreglass mesh of the core.

It will however be appreciated that in all forms of the invention, while any number of layers can be provided, it is essential that the material include an outermost coating layer outwardly of (and on the leading or attack side of) one or more core layers. It is of course important that at some stage within the material a bullet or bullets firstly pass through the coating layer to be blunted, stripped and have the velocity reduced, and to thereafter pass through one or more core layers to be emeshed in and arrested by the fibreglass mesh of the one or more core layers.

It should be appreciated that the example shown in FIGS. 1, 2 and 3 of the accompanying drawings are by way of example only and that various forms of construction utilising the present invention can be arrived at, depending upon the desires of a user, manufacturer or the like, or depending upon security requirements of the party for whom the installation is being manufactured and carried out.

It has been found in experimentation that the coating layer 2, including at least 50% (by volume) filler particles acts to blunt and/or strip a bullet passing thereinto (as referred to with reference to the accompanying drawings) and also acts to reduce the velocity of the bullet, whereafter the blunted/stripped bullet of reduced velocity passes through into the core where fibreglass matting arrests the bullet. In preferred forms of the invention, it has been found in experimentation that it is particularly advantageous for the coating layers to include at least 50% (by volume) hollow spheres as fillers in the coating layer.

Having passed through the coating layer, and having been blunted and stripped and having the velocity thereof reduced, the bullet or bullets pass into the fibreglass matting of the core layer or layers. In this regard it is important to note that the ratio of fibreglass matting/resin is such that the bullet is in essence stopped and held within the core by being emeshed and entangled within the fibreglass fibres of the matting. It should of course be appreciated that if there is too much resin used in the formation of the core, there will be insufficient fibrous matting to act on and emesh the bullet and in such circumstances (where excess resin is used), the blunted/stripped bullet with a reduced velocity (having passed through the coating layer) may well merely 'pop out' or be 'punched through' a piece of fibreglass matting and therefore continue past the fibreglass matting and out of the core layer. While this is unlikely, it may happen if excess amounts of resin are used in the formation of a core. It is therefore important that the core retain and have fibrous characteristics.

While the invention has been described by way of example only, with reference to fillers being in the form of hollow spheres, it should of course be appreciated (as described hereinbefore) that fillers can be in other forms such as for example flake forms. Alternatively, the filler particles can be in the form of a combination of hollow spheres and flakes.

The present invention provides a particularly useful bullet resistant material which can be used for security purposes and in domestic uses, any construction of diplomatic installations, defence installations, banks and other areas requiring security and bullet resistant protection.

The present invention therefore provides a particularly effective bullet resistant material as will be appreciated from the examples and test results set out above. It must be appreciated however that these are by way of example only and that many variations of bullet resistant material using the present invention can be arrived at without departing from the scope of the invention as defined by the appended claims.

We claim:

1. A bullet resistant material including at least one integral and compressed fibrous core, formed of fibrous material bonded together with resin; said at least one core having a coated material on at least one face thereof; said coating material including at least resin and at least 50% (by volume) of a plurality of filler particles, said filler particles being in the form of hollow spheres of fused alumino silicate having no less than 10% wall thickness.

2. A bullet resistant material as claimed in claim 1, wherein said filler particles are in the form of hollow microspheres.

3. A bullet resistant material as claimed in claim 1, wherein said filler particles are in the form of a combination of hollow spheres and silicate flakes.

4. A bullet resistant material as claimed in claim 1, wherein said fibrous material is in the form of fibreglass matting.

5. A bullet resistant material as claimed in claim 1, wherein said core is formed from a plurality of resin impregnated fibrous mats bonded and compressed together.

6. A bullet resistant material as claimed in claim 1, wherein said coating layer is provided on a leading or attack phase of at least one core.

7. A bullet resistant material as claimed in claim 1, including at least 60% (by volume) filler particles.

8. A bullet resistant material including at least one integral and compressed fibrous core formed from a plurality of fibreglass mats bonded and compressed together; at least one coating layer being provided on at least an outer or attack face of said core; said coating layer including resin and at least 50% (by volume) of a plurality of silicate filler particles.

9. A bullet resistant material as claimed in claim 8, wherein said filler particles are in the form of hollow spheres.

10. A bullet resistant material as claimed in claim 8, wherein said filler particles are in the form of hollow spheres of fused alumina silicate having no less than 10% wall thickness.

11. A bullet resistant material as claimed in claim 8, wherein said filler particles are in the form of hollow microspheres.

12. A bullet resistant material as claimed in claim 8, wherein said filler materials are in the form of silicate flakes.

13. A bullet resistant material as claimed in claim 8, wherein said filler particles are in the form of a combination of hollow spheres and silicate flakes.

14. A bullet resistant material as claimed in claim 8, wherein said coating layer is provided on a leading or attack face of at least one core.

15. A bullet resistant material as claimed in claim 8, including 60% (by volume) of filler particles.

16. A bullet resistant material including at least one integral and compressed fibrous core formed of a plurality of compressed and bonded fibreglass mats; at least one coating layer being provided on at least one outer or attack face of said core; said coating layer being in the form of a combination of resin and at least 50% (by volume) of a plurality of hollow spheres of fused alumino silicate, having no less than 10% wall thickness.

* * * * *